United States Patent
Araki et al.

(10) Patent No.: US 12,529,604 B2
(45) Date of Patent: Jan. 20, 2026

(54) THERMAL IMAGING CAMERA MODULE CONFIGURED FOR INTEGRATION INTO A HOST SYSTEM

(71) Applicant: Seek Thermal, Inc., Goleta, CA (US)

(72) Inventors: Leonard Araki, Santa Barbara, CA (US); Lars Mininni, Santa Barbara, CA (US); William J. Parrish, Santa Barbara, CA (US)

(73) Assignee: Seek Thermal, Inc., Goleta, CA (US)

( * ) Notice: Subject to any disclaimer, the term of this patent is extended or adjusted under 35 U.S.C. 154(b) by 298 days.

(21) Appl. No.: 18/316,986

(22) Filed: May 12, 2023

(65) Prior Publication Data

US 2023/0366740 A1 Nov. 16, 2023

Related U.S. Application Data

(60) Provisional application No. 63/364,752, filed on May 16, 2022.

(51) Int. Cl.
*G01J 5/22* (2006.01)
*G01J 5/00* (2022.01)

(52) U.S. Cl.
CPC .......... *G01J 5/22* (2013.01); *G01J 2005/0077* (2013.01)

(58) Field of Classification Search
None
See application file for complete search history.

(56) References Cited

U.S. PATENT DOCUMENTS

| | | | |
|---|---|---|---|
| 9,277,142 B2 * | 3/2016 | Kuiken | H04N 25/671 |
| 2012/0211648 A1 | 8/2012 | Linsacum et al. | |

(Continued)

FOREIGN PATENT DOCUMENTS

| | | |
|---|---|---|
| CN | 101 567 979 A | 10/2009 |
| CN | 110 731 079 | 3/2022 |
| WO | WO 2021/207557 A1 | 10/2021 |

OTHER PUBLICATIONS

International Search Report and Written Opinion mailed on Sep. 12, 2023 in International Application No. PCT/US2023/022111, in 15 pages.

*Primary Examiner* — Marcus H Taningco
(74) *Attorney, Agent, or Firm* — Knobbe, Martens, Olson & Bear LLP

(57) ABSTRACT

Thermal cameras exist at price points and volume manufacturing suitable for practical consideration of integration of thermal camera modules into host electronic devices, including automobiles, PED's—smartphones, tablets, etc. However, individual thermal cameras require extensive unit-specific data to provision and operate each individual camera with acceptable performance. This along with non-standard electrical interfaces, are adoption barriers to host device manufacturers, for example, where some devices, including some PED's, have become bus-based platforms allowing for functional modules to be packaged into common PED's and operated by way of apps. Some modern PED's, for example, include standard high-speed data busses and low-speed control busses. Devices and methods are disclosed for delivering compatibility with standard internal interfaces and storing the camera module's unit-specific data in a memory element on the camera module. The data can be read out on the same data bus used for thermal camera image data, either by selection between stored data and video output or by simultaneous streaming on different virtual channels. In a particular embodiment the logic element may be configured to write per pixel runtime data such as bias voltages on a runtime per pixel basis to the FPA as the FPA operates by accessing the memory element from a starting point address, wherein the starting point address may be at least one of predetermined or set by a host controller, (Continued)

thereby allowing the FPA to operate without local processing resources or per pixel communication with the host controller.

31 Claims, 5 Drawing Sheets

(56) References Cited

U.S. PATENT DOCUMENTS

| | | |
|---|---|---|
| 2014/0146180 A1 | 5/2014 | Denham |
| 2015/0319379 A1 | 11/2015 | Nussmeier et al. |
| 2016/0269651 A1 | 9/2016 | Venkataraman et al. |
| 2019/0158769 A1 | 5/2019 | Walsh et al. |
| 2020/0120292 A1 | 4/2020 | Cologlu et al. |

* cited by examiner

THERMAL IMAGING CAMERA MODULE CONFIGURED FOR INTEGRATION INTO A HOST SYSTEM

CROSS-REFERENCE TO RELATED APPLICATIONS

This application claims the benefit of U.S. Provisional Application Ser. No. 63/364,752, filed May 16, 2022, entitled THERMAL IMAGING CAMERA MODULE CONFIGURED FOR INTEGRATION INTO A HOST SYSTEM, which is incorporated by reference herein in its entirety.

FIELD

The present disclosure generally relates to thermal cameras, and in particular to thermal cameras designed as modules for integration into a host system electronic device, such as a personal electronic device (PED) or an automobile vision system.

BACKGROUND

The increasing availability of high-performance, low-cost uncooled thermal imaging devices, such as those based on bolometer focal plane arrays (FPAs), is enabling the design and production of mass-produced thermal imaging cameras. In order to successfully integrate such cameras into mass market host devices such as vehicle systems or PED's including smartphones, tablets and the like, it would be beneficial for thermal camera modules intended for such integration to integrate in a fashion consistent with other functional host compatible modules.

SUMMARY

The devices and methods of this disclosure each have several innovative aspects, no single one of which is solely responsible for its desirable attributes. Without limiting the scope as expressed by the claims that follow, its more prominent features will now be discussed briefly.

Thermal cameras exist at price points and volume manufacturing suitable for practical consideration of integration of thermal camera modules into host electronic devices, including automobiles, PED's (e.g., smartphones, tablets, etc.), and the like. However, individual thermal cameras require extensive unit-specific data to provision and operate each individual camera with acceptable performance. This characteristic, along with non-standard electrical interfaces, are adoption barriers to host device manufacturers, for example, where some devices, including some PED's, have become bus-based platforms allowing for functional modules to be packaged into common PED's and operated by way of apps. Some modern PED's, for example, include standard high-speed data busses and low-speed control busses. Devices and methods are disclosed for delivering compatibility with standard internal interfaces and storing the camera module's unit-specific data in a memory element on the camera module. The data can be read out on the same data bus used for thermal camera image data, with the selection between stored data and video output made by the host. In a particular embodiment the logic element may be configured to write per-pixel runtime data such as bias voltages to the FPA on a per pixel basis as the FPA operates by accessing the memory element from a starting point address, wherein the starting point address may be at least one of predetermined or set by a host controller, thereby allowing the FPA to operate without local processing resources or per pixel runtime communication with the host controller.

In a first aspect, a thermal camera module (TCM) configured for integration as a functional module into a host electronics device is described. The host electronics device includes at least one controller and at least one internal interface for accommodating functional modules of various types into the host electronics device. The TCM includes at least one focal plane array (FPA) including a detector array integrated with a read-out integrated circuit (ROIC), whose output is image frame data, including command and control input/outputs (I/O) and image frame data outputs; at least one memory element loaded with data including at least one of provisioning and operational data for the FPA; and at least one control logic element, interfaced to FPA command and control registers, an image frame data output of the FPA, the at least one memory element, and the at least one internal interface; wherein the control logic element is configured to, including in response to host controller commands on the at least one internal interface, enable read/write access to the at least one memory element, read/write access to ROIC control registers, and read access to FPA image frame data output.

In some embodiments, the TCM is configured to be mechanically and electrically plug-in compatible with an internal module format of the host electronics device.

In some embodiments, FPA provisioning data includes at least one of: integration time; bias voltages; row and column configuration; and FPA configuration and identification. In some embodiments, the control logic element is configured to write one of bias voltages or other runtime data on a runtime per pixel basis to the FPA as the FPA operates by accessing the memory element from a starting point address, wherein the starting point address is at least one of predetermined or set by the host controller, thereby allowing the FPA to operate without per-pixel communication with the host controller.

In some embodiments, FPA operational data includes at least one of: thermography calibration data; detector gain tables; ambient temperature induced drift bias correction data; display look up tables; bad pixel maps; lens correction data; and other factory calibration data.

In some embodiments, the at least one internal interface includes at least two internal interface busses, the at least two internal interface busses including: a low-speed data bus for low data rate applications including command and configuration data; and a high-speed data bus suitable for high data rate applications including video data. In some embodiments, the low-speed data bus supports bidirectional communication between the host controller and the control logic element, including one or more of the control logic element enabling the host controller to: optionally read provisioning data from the memory element; read and write to the ROIC registers, including setting provisioning data into the ROIC registers; enable reading operational data from the memory element on the high-speed data bus; enable running the ROIC; and select acquisition of FPA video data on the high-speed data bus. In some embodiments, communication between the host controller and the TCM on the high-speed data bus is unidirectional. In some embodiments, the low-speed data bus is $I^2C$. In some embodiments, the high-speed data bus is one of MIPI CSI-2 or MIPI CPI. In some embodiments, bus supplied checksum and line/frame count data that is provided with the image frame data is available for integrity verification of the FPA.

In some embodiments, the memory element includes non-volatile memory. In some embodiments, the non-volatile memory includes flash memory.

In some embodiments, the memory element includes a QSPI memory element and the TCM control logic element includes a QSPI controller master. In some embodiments, the QSPI memory element includes at least one of Flash or SPI RAM.

In some embodiments, an ROIC clock is part of the ROIC and whose frequency is set by programmable fuses at the time of manufacture whereby the clock frequency cannot be changed after the fuses are burned.

In a second aspect, a method is disclosed for operating a thermal camera module (TCM), including a focal plane array (FPA), a control logic element and a memory element, configured for integration as a functional module into a host electronics device. The host electronics device includes at least one controller and at least one internal interface for accommodating functional modules of various types into the host device. The method includes, by the control logic element, including in response to host controller commands on the at least one internal interface: enabling read/write access to the memory element; enabling host controller read/write access to ROIC control registers; enabling ROIC run time access to the memory element during image acquisition; and enabling read access to FPA image frame output.

In some embodiments, the TCM is configured to be mechanically and electrically plug-in compatible with an internal module format of the host electronics device.

In some embodiments, FPA provisioning data includes at least one of: integration time; bias voltages; row and column configuration; and FPA configuration and identification.

In some embodiments, FPA operational data includes at least one of: thermography calibration data; detector gain tables; ambient temperature induced drift bias correction data; display look up tables; bad pixel maps; lens correction data; and other factory calibration data.

In some embodiments, the at least one internal interface includes at least two internal interface busses, including a low-speed data bus for low data rate applications including command and configuration data and, a high-speed data bus suitable high data rate applications including video data. In some embodiments, the low-speed data bus supports bidirectional communication between the host controller and the and the TCM control logic element, including one or more of the control logic element enabling the host controller to: optionally read provisioning data from the memory element; read and write to the ROIC registers, including setting provisioning data into the registers; enable reading operational data from the memory element on the high-speed data bus; enable running the ROIC; and select acquisition of FPA video data on the high-speed data bus. In some embodiments, communication between the host controller and the TCM on the high-speed data bus is unidirectional. In some embodiments, the logic element is configured to enable writing at least one of calibration or run time data to the high-speed bus simultaneously with video data.

In some embodiments, the logic element is configured to enable writing one of bias voltages or other runtime data on a per pixel basis as the FPA runs to the FPA by accessing the memory element from a starting point address, wherein the starting point address is at least one of predetermined or set by the host controller, thereby allowing the FPA to operate without per-pixel communication with the host controller.

In some embodiments, the method includes using bus supplied checksum and line/frame count data provided with the image frame data for integrity verification of the FPA.

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations are merely examples and are not intended to be limiting. Throughout the drawings, similar symbols typically identify similar components, unless context dictates otherwise.

DETAILED DESCRIPTION

Figure 1A:
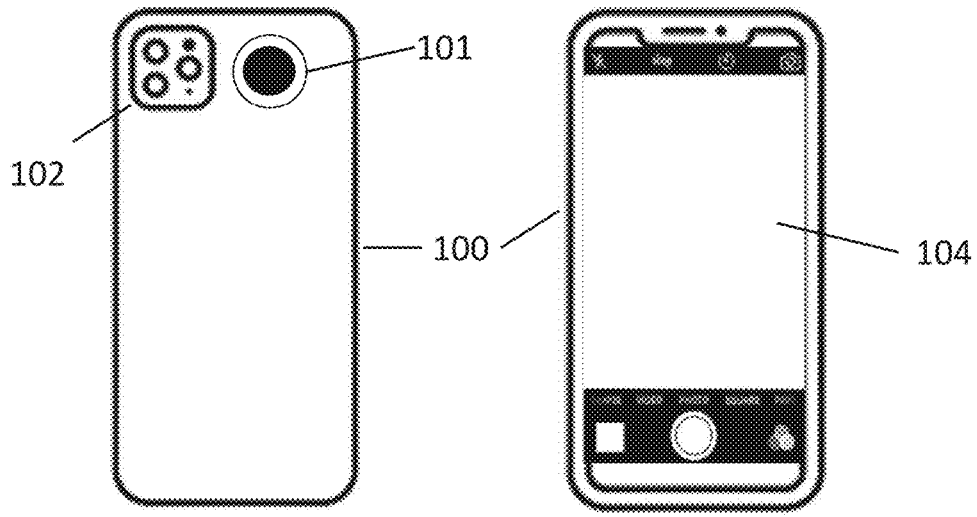
FIG. 1A shows an example integration of a thermal camera into a Personal Electronic Device (PED) as an example of a host electronic device.

The following description is directed to certain implementations for the purpose of describing the innovative aspects of this disclosure. However, a person having ordinary skill in the art will readily recognize that the teachings herein can be applied in a multitude of different ways.

Generally described, embodiments of the present disclosure relate to making a thermal camera more easily compatible with host devices, for example, host devices having standardized interface and integration protocols. Thermal cameras are not yet mainstream devices as modules for integration with host devices. However, recent product development efforts by several entities, including the assignee of the current application, have resulted in thermal imaging devices in the sub-$100 price range and proven manufacturability of tens of thousands of units per year. Such devices can, and have, in the past few years, achieved a level of mass market penetration that is unprecedented for this technology.

The majority of visible imaging capability in the hands of most consumers is that provided by PED's, e.g., smartphone cameras, and cameras mounted or integrated in automobiles. Thermal image, data even in simplified form, can add much value to the PED user experience. Thermal imaging can also contribute greatly to the safe operation of automobiles. Given the value added and the availability of thermal imaging technology at low cost and high volume, integration with PED's and other host systems would seem desirable. Yet it has been slow to happen.

Many consumer electronic device designs, including many PED's, have moved from a monolithic closed vertically integrated technology to a more platform-based system design. The current disclosure is applicable to any device using a type of host platform architecture, but it is understood that PED's are a major example of this type of device.

Accordingly, much of the present disclosure will use PED's as an exemplary model for host platform designs. However, a variety of other host-based systems, such as the advanced driver assistance systems (ADAS) in automobiles, etc., could benefit from the present disclosure. Accordingly, it will be understood that the systems and methods disclosed herein are not limited to implementation with PED's or any other particular type of host platform, and can be implemented in connection with many types of host platforms without departing from the scope of the present disclosure.

Many host systems, such as some modern smartphones and tablets, are designed in such a way that the various functional modules, displays, visible cameras, accelerometers, GPS modules, etc., are produced by specialized vendors and integrated into the PED. This is accomplished by establishing an interior architecture with standardized mechanical and electrical interfaces. The operation and user interface part of the module is handled by the very powerful PED processor communicating over the internal interfaces and running apps directed to the individual modules. Thus, changing or upgrading the configuration of such a device no longer requires a ground up re-design but in fact can be accomplished by upgrading the functional modules and associated apps while retaining the host platform architecture and much of the underlying operational code.

In order to seamlessly become a part of this host platform-based, functional module system, a Thermal Camera Module (TCM) can advantageously look as much as possible like the other functional modules already common in in electronic devices. FIG. 1A shows an example host device, a PED 100 (e.g., a smartphone), with integrated TCM 101. Also shown is another common module, visible camera 102, as well as a display 104 which often doubles as the user interface in the form of a touch-sensitive display (e.g., a touchscreen or other combined display and user interface).

Figure 1B:
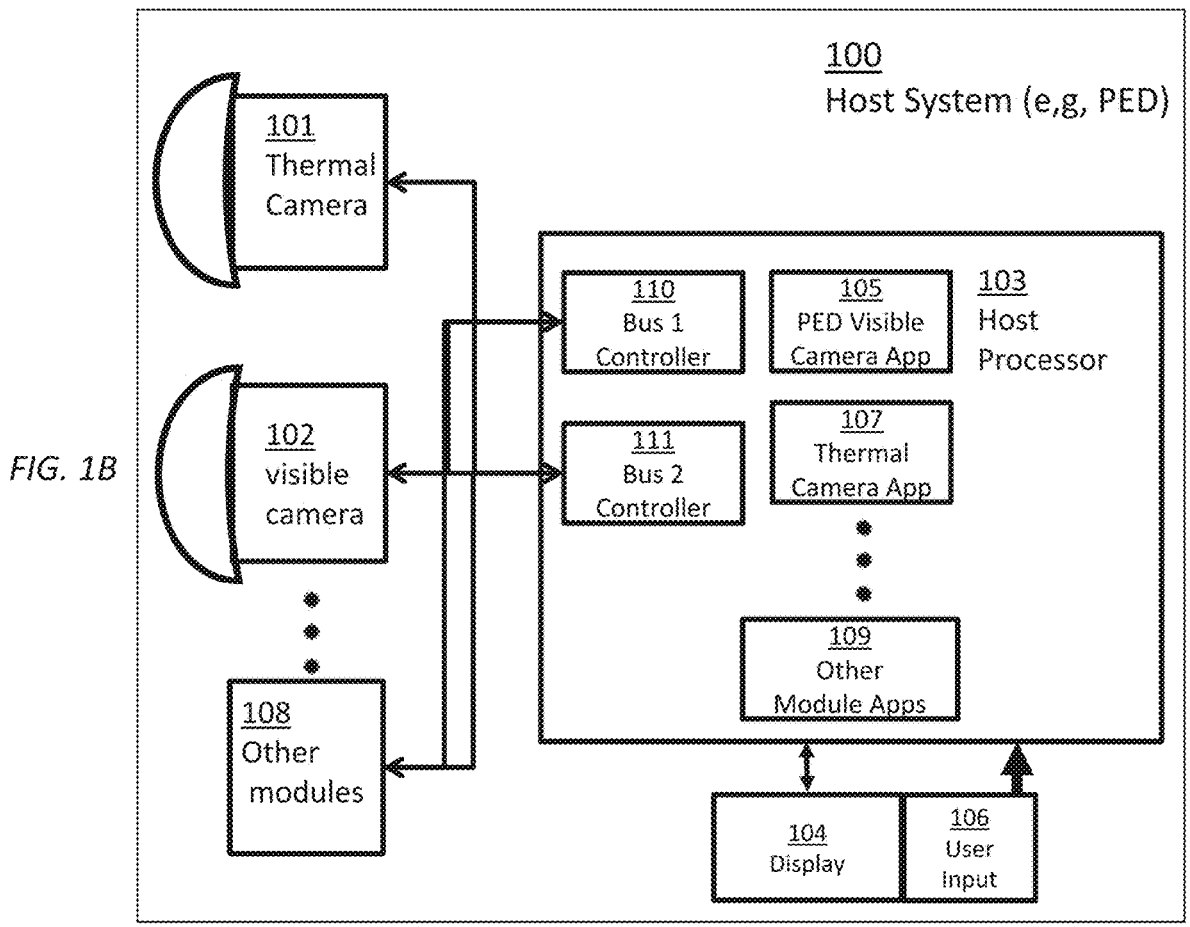
FIG. 1B is a block diagram illustrating an example host device with an integrated thermal camera.

FIG. 1B schematically illustrates an example system integrating a TCM into this system. The PED 100 includes a processor 103, typically relatively fast and powerful, a user display 104, and a user interface 106. These are shared resources for the PED platform. Multiple interfaces, busses, and/or bus controllers 110, 111 put the processor in communication and in control of various functional modules, such as visible camera 102, other modules 108 of the types described above, as well as others. Various apps run on the processor, some of which may be associated with each module, such as visible camera app 105, and other apps 109 associated with other modules 108. Thus, the example host (e.g. PED 100) is a host platform with standardized internal interfaces and shared resources, allowing for rapid upgrades in capability as module capability increases. Even the processor can be upgraded easily as long as the interface compatibilities are brought forward. As shown, a suitable TCM 101, with associated app 107 and bus connections as appropriate, could potentially fit in with this architecture.

However, unlike other types of modules that can be readily incorporated into existing host platforms, current thermal cameras (and in particular, inexpensive mass-produced devices) can have issues that make fitting into this host platform concept difficult. First, most existing thermal camera designs are produced for dedicated applications and they do not have standardized electrical interfaces or data formats. Even where they are designed to be integrated according to standards, those standards are generally applicable at a higher level of integration, such as USB or SPI interfaces, and are not directly compatible with PED internal platform standards. This issue, coupled with other difficulties, complicates the integration of TCM's into common host platform devices.

Also, most inexpensive, mass producible thermal cameras are based on Focal Plane Array (FPA) designs using microbolometer photodetector arrays as the thermal imaging sensor. These photodetectors operate in the thermal wavelengths (e.g., in the range of about 8-12 micrometer) at room temperature and have enabled the evolution of thermal imaging from highly expensive, low volume aerospace and high-end commercial systems to devices that are easily affordable and producible in large quantities. However, these devices are extremely sensitive to ambient temperature, sometimes more so than to the thermal radiation they are meant to detect. They are also prone to process variations in their manufacture and a host of other image degradation effects. This results in imagers that require a significant amount of processing to extract accurate data and/or quality imaging from raw photodetector data that suffers from, among other degradations, low signal to noise ratio, drift with temperature, drift over time, and non-uniformity effects. These limitations can in some cases be addressed with techniques such as filtering, offset correction, fixed-pattern noise reduction, thermal gradient correction, gain correction, and other techniques.

The image processing involved to compensate for these image quality effects in and of itself would not be an issue as PED processors are powerful and in many cases more than adequate to handle the processing even for high frame rate data. However, all of these effects may vary from camera to camera, and from pixel to pixel within an individual camera. Thus, to perform the example processing described above, each individual TCM is extensively tested and characterized on a per unit, pixel by pixel basis. The resulting data from such testing and characterization, which is unique to each individual camera unit, accordingly should be available to a host system processor for the specific individual camera installed in each individual host system. This operational requirement for TCM's is diametrically opposed to generic characterization data for all units of a given camera model as is often the case for visible cameras.

This provision of data specific to an individual TCM entails a significant amount of unit specific data being installed on each individual host device. Thus, to perform the example processing described above, each individual TCM is extensively tested and characterized on a pixel-by-pixel basis. In some cases, extensive correction tables and temperature conversion tables, using data acquired at test and calibration of each camera, along with real-time data from FPA ambient temperature readings, are used to process and analyze the raw camera image frame data, both to ensure accurate scene temperature information as well as clean appearing, high quality images. Thus, the host processor may need to have unique data for each TCM, and in many cases for each pixel in each TCM. Data for provisioning the TCM (e.g., FPA set-up details) may include numbers of rows, number of columns, bias settings, integration times, chip ID and others. Data for operation may include uniformity correction data (including pixel response variation data), thermography data vs ambient temperature, bad pixel information, and others. Moreso, often per pixel real time information such as pixel biases may need to be supplied to the FPA during run time, e.g., during imaging in a per pixel basis. Thus, many current TCM's have integrated processors that are very active in the run time operation of the image sensors and the delivery of individual TCM specific information and usually some level of image processing.

Currently, TCM's are usually integrated into systems in one of two ways. For dedicated product manufacture, such as products made by the FPA manufacturer, the camera data is just loaded into device memory directly from calibration and testing of the camera-based product. For OEM integration of a TCM into another manufacturer's product, a data file, or access to a data file, is provided with each unit, and the OEM manufacturer installs the unit-specific data during manufacture of the OEM product. In some cases, this data is embedded in the TCM in something like a flash memory, but these more advanced TCM's usually require an expensive camera control processor to run the camera core, access the memory, and direct the operation and data delivery to the host, in many cases by way of a serial interface as such TCM's are designed to be general purpose and suitable for many applications in an independent manner.

The first approach is not applicable to host system integration, such as with PED's. In theory, the second approach is workable. However, in practice, large volume PED manufacturers are not set up to separately install and use unique data, and establish unique run time data delivery operability, for each individual module installed in each specific PED unit. The approach of PED's and other modern host platform systems is based on needing conformity of each functional module and its associated operability for all units of a given design.

However, in accordance with the present disclosure, the nature of the host platform design can be used in a unique and innovative fashion to make it possible for each TCM and its associated app to look uniform as far as the host processor is concerned, and desirably in a manner that requires only simple logic in the TCM and fully utilizes the host controller capabilities, without requiring the host processor to control real time image acquisition, or perform any individual TCM unit-specific operations other than at set-up, or periodic updating. This approach is a major improvement, in terms of cost and interoperability, compared to many current TCM's which require a module-level processor or controller to operate. The approach uses the nature of the internal data interfaces usually present in modern platform-based device designs, including many PED's. Most platform design PED's have at least one high-speed data interface. This interface is used for data such as the video output of the ubiquitous visible cameras found in almost all PED's. There is also often present a lower speed bus used for low data transfer such as for control commands, position sensor, temperature sensor, and others. Use of these busses and data interfaces in a novel way allows for an elegant solution to the unit-specific data issue for TCM's.

Figure 2A:
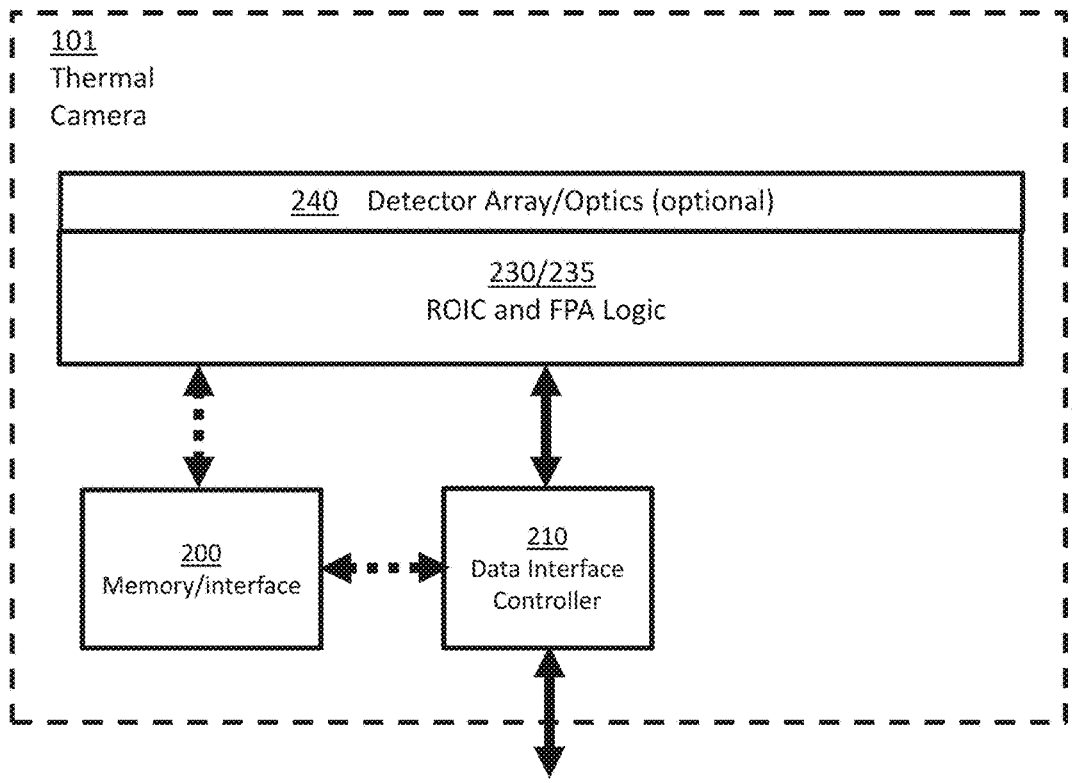
FIGS. 2A and 2B are block diagrams illustrating example thermal camera modules (TCMs) configured for integration into a host device, exemplified by a PED.

Referring to FIG. 2A, a TCM 101 configured for integration with a host platform with standard interfaces is shown in block diagram form. Detector array 240 with or without optics, depending on the platform design, forms the radiation-sensing part of the camera. The array is mated in any of a variety of fashions with a Read-Out Integrated Circuit (ROIC) 230 The two devices together form a Focal Plane Array (FPA). For the case where the FPA is part of a TCM, a FPA control logic 235, is present to, among other functions, handle communication with the host platform interfaces and other elements not necessarily present in a more conventional FPA. In particular, the FPA control logic 235 is interfaced to a data interface 210, possibly by way of a bus controller, which may or may not be a separate device. Also present in platform compatible TCM is a memory element and associated interface 200. Memory element and associated interface 200 may be physically part of TCM 101. The memory interface may be either/or directly to the ROIC or both the ROIC and the Host by way of the data interface. Various levels of integration of memory are possible, ranging from a separate device packaged onto whatever substrate carries the FPA, to being integrated into the ROIC circuit itself. The memory device may be accessed through the FPA control logic or directly via the data bus. However, the first case will be discussed in detail below.

Memory element and associated interface 200 at a minimum can be loaded with the provisioning and/or operational data required for its FPA, either before shipment to the platform integrator, or less commonly during system setup. As such, a non-volatile memory may be suitable. However, it is also possible that TCM operation and performance may benefit from having part of the memory writable, so various forms of FLASH, EPROM, RAM and other memory forms may be intermixed. The minimum memory requirement is that basic FPA specific data files are made available from the TCM at a time later than TCM shipment.

Thus, with the memory element appropriately loaded, the TCM will not require any external information to operate. However, more may be required to make the TCM and associated app act like any other platform functional module.

When the control processor of the platform device (e.g., of a PED; we will refer to the device as the PED henceforth even though other type devices are equally possible) activates a TCM App, either for the first time, or other times as appropriate, the TCM app sends commands on to the TCM instructing it to provide all or part of the contents of memory device to the host on the data interface 210.

For many TCM's the type of data may be of two types. One part, which we refer to as provisioning data, by which we mean data needed at the FPA level for the FPA to run, contains the set-up and run parameters to operate the FPA. Many ROIC's accept this data by loading registers which in turn digitally select the internal operations of the FPA such as integration time, row and column switching order, applied biases and other functions, for example, as described in U.S. Pat. No. 9,584,750, the entirety of which is incorporated by reference herein. This provisioning data may only be a few kilobytes. It can be communicated in variety of ways, at low speed, either stored in the TCM memory, or if consistent across TCM's, reside in the TCM app on the host processor. However, for some FPA designs, it is possible that some provisioning data sets may be much larger, including data that needs to be provided on a per pixel basis at runtime as the FPA operates in imaging mode. One example of this type of runtime per pixel data are the biases applied to each pixel as the FPA clocks through imaging cycles. For the particular bias architecture described, the bias voltages may change with ambient temperature, which may result in even larger runtime provisioning data sets, as per pixel bias sets at more than one ambient temperature may be desirable. Accommodating run time per pixel provisioning data will be described below.

The operational data, by which we mean data used at the host processor level for image processing, including the calibration and thermography information described above, can be a very large data set and will often be camera specific and may have to reside in the TCM memory element and be accessible at high speed.

Since data interface 210 needs to be fast enough for video, the operational data, can be uploaded very quickly. The app can be standard for all TCM's of a given design, and simply configured to access and make use of the unit-specific information in the same manner for all units. Once the app, running at the PED processor level, has acquired the configuration of the FPA, and has all of the correction information, it can send instructions to switch over to image frame video data for normal operation of the TCM. This information can be accessed at any time as needed, at start-up, or otherwise, and as mentioned above can, for the right type of memory (e.g., including some writable memory), allow for in-use updates or modifications of operational data.

FIG. 2A shows a configuration with one interface between the TCM and the host, and it is assumed that such an interface is suitable for both high-speed data, such as video frames and lower speed data as needed. Such interfaces exist.

Figure 2B:
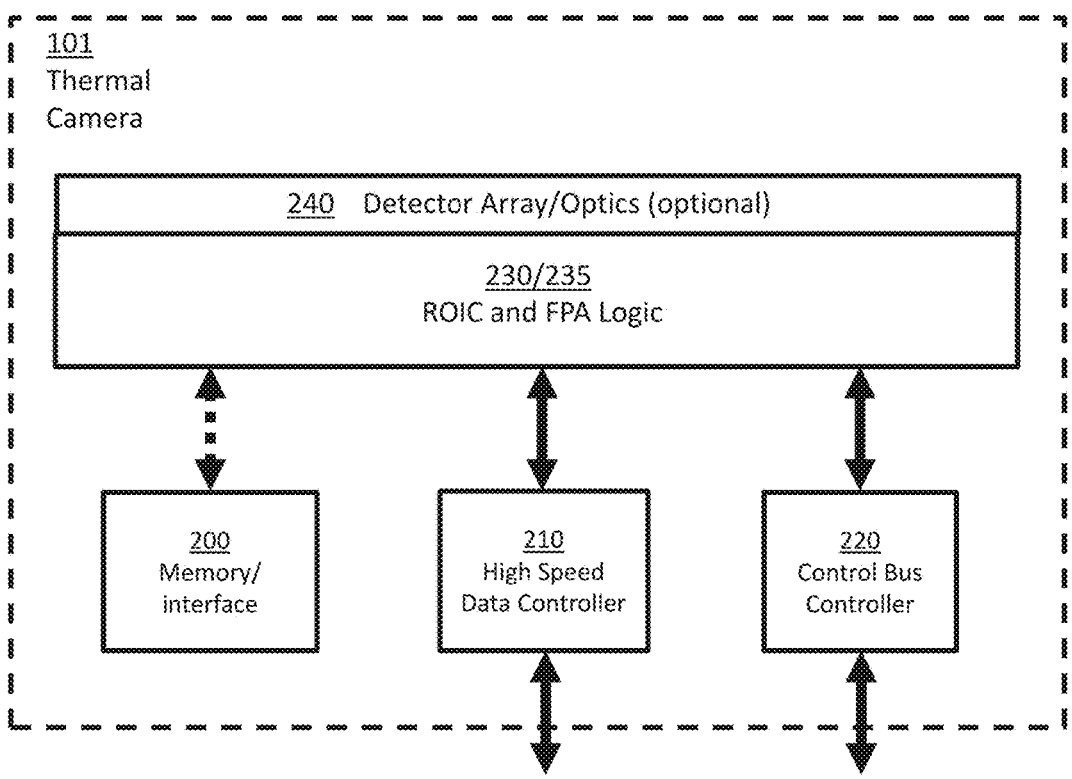

FIG. 2B shows an alternative approach, common to many host systems. In this case the interface to the host is split into two interfaces, a control bus 220 which may be low speed and a data interface 210 which is usually adequate for video. In either case, such a standard data interface arrangement allows for a very low cost TCM, because unlike most existing thermal camera cores designed for integration into systems, using the data bus approach and host processing power, the TCM can be implemented with minimal logic resources, and in particular may not require a processor at all, and may instead be implemented with only simple logic, which may for some embodiments be designed directly into the ROIC. FIG. 2B shows the case with memory interfaced directly to the ROIC; the memory is thus accessible through the ROIC control logic directly to the ROIC or by way of the ROIC to the host.

In this case, the host processor communicates with FPA control logic 235 through control bus 220 and is also connected to a high-speed data interface 210. FPA control logic 235 allows the host to perform a variety of functions directly without the need of a local FPA processing device. For instance, the host can address the ROIC and load registers, read status, start and stop operation and select either memory element and associated interface 200 access or FPA video data connection to the high-speed data interface 210 or bus. Thus, the operational data can be accessed and loaded to the FPA and the high-speed data interface can alternatively be used for memory data or video data, all under direct host control, requiring simple steering logic only at the TCM level. This can dramatically reduce the cost of such a TCM and make the TCM appear more like existing host compatible devices, where the run time video data is delivered on a standard high-speed video data interface. In some embodiments, only the low-speed control bus need support bi-directional communication, and the high-speed interface can be operated as unidirectional only. This operational case is compatible with many existing host systems.

With such an approach, TCM's of a given design are all mechanically and electrically identical, and the TCM app is compatible with any TCM of that design. The contents of the pre-loaded memory can be unique, and the app handles this unique information in a way that is uniform from the point of view of the host processor. Runtime video acquisition can operate similarly or exactly to standard visible camera modules. Thus, platform integration of a totally unique module is achieved in a way that has no unit-specific impacts on the platform. It is the novel use of the the nature of the platform standard interface arrangements that makes the approach achievable.

Figure 3:
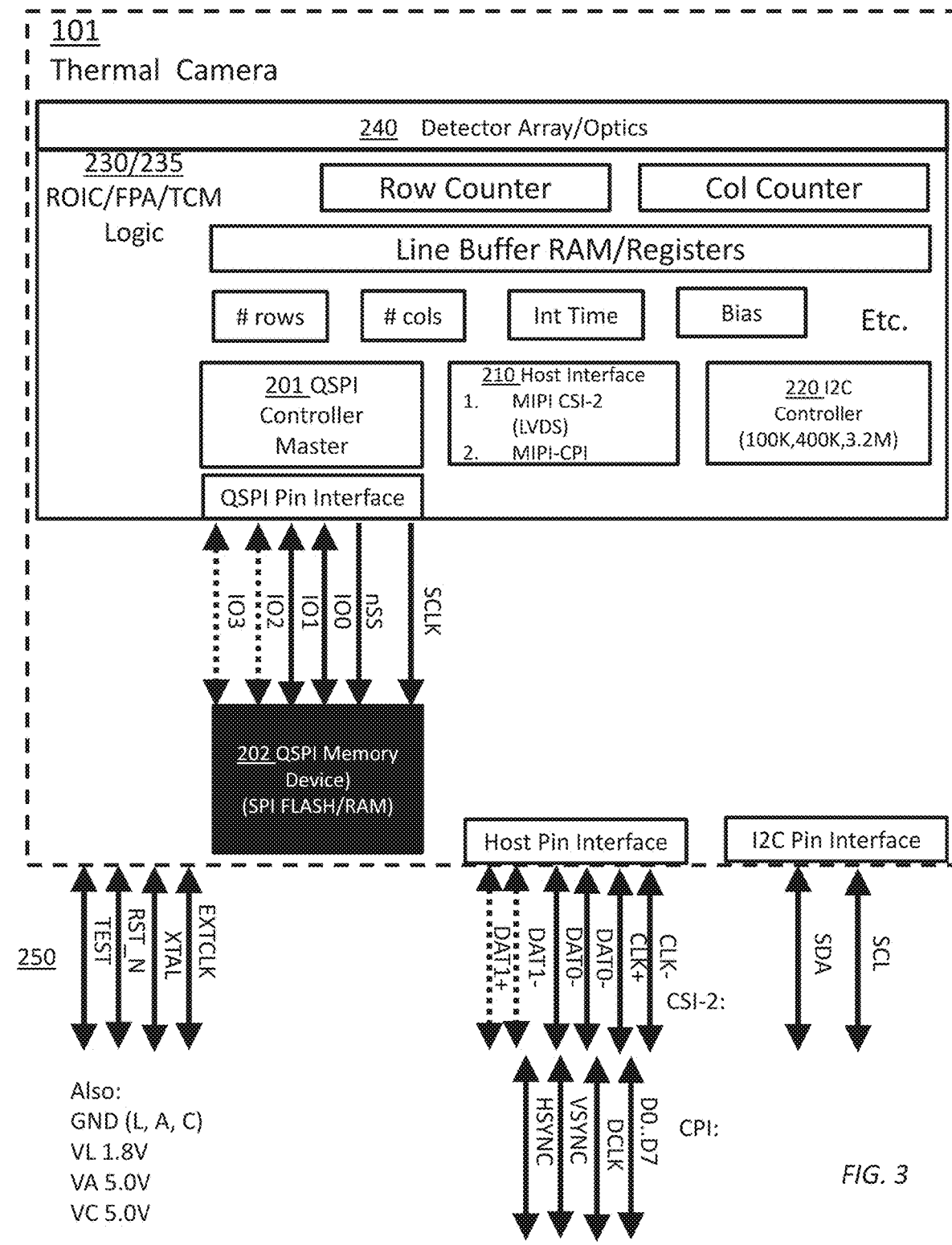
FIG. 3 is a block diagram illustrating a specific example embodiment of a TCM configured for integration into a PED.

FIG. 3 shows examples of a TCM 101 of the type disclosed with actual suitable bus and interface examples currently available and found in some platform PED designs. As shown in FIG. 3, photodetector/optics elements such as detector array 240 integrated with ROIC logic elements such as FPA control logic 235 form the FPA basis of the TCM 101. The various ROIC, FPA/TCM logic functions are shown as grouped, but it is understood that the various functional logic elements can be distributed as desired and workable for a given design. No processor is required at the TCM level.

Shown as part of TCM 101 (and physically carried as part of the TCM) is an example memory bus, the quad serial peripheral interface (QSPI) controller master 201 and pin interface interfaced to QSPI memory element 202, which by way of example is shown as either FLASH memory, and/or SPI RAM. As just a few 10's of megabytes is usually enough for thermal FPA data requirements, such devices are suitable.

The exemplary host high-speed host data interface 210 is shown as either of two common types MIPI CSI-2 or MIPI CPI. MIPI, (Mobile Industry Processor Interface) is commonly used for high-speed internal PED data, with CSI and CPI being two variations of camera specific versions. For Automotive, video busses such as LCDS and FPD are analogous.

This interface is shown in the embodiment of the Figure as external to the TCM connection, from the TCM to the host high-speed data bus. Both example busses are used in current PED's for video.

The example control bus 220 interface is shown as I²C. For the case where a MIPI version is used, MIPI implementations include both a bidirectional I²C bus and a highspeed unidirectional video bus. This bus is also external to the TCM connection, from the TCM to the host control bus. The I²C bus is used in current PED's for command and control as well as low-speed data, often in combination with the video bus. For automotive applications, the controller area network (CAN) bus is a common control bus. Although the MIPI variations were originally developed for PED's, their power and versatility, along with the commercial availability of design packages and/or chipsets, is appealing to other platform developers and MIPI use is growing rapidly for many host system applications beyond PED's.

Also shown are host general interface connections 250 including power and ground as well as a synchronizing clock.

The individual example components shown in FIG. 3 can exist currently in host platform designs and are adequate to allow for the implementation of the techniques described in this disclosure.

Figure 4:
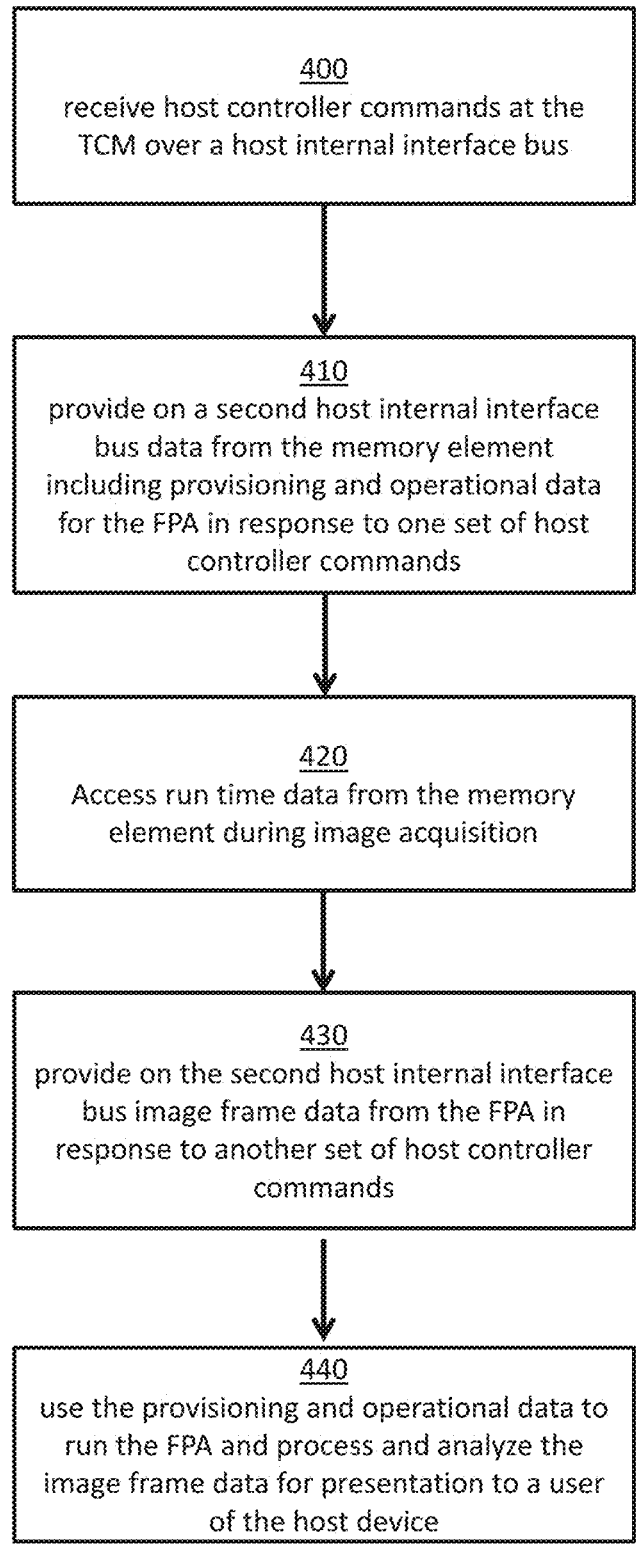
FIG. 4 is a flow chart illustrating an example method for operating a host device compatible TCM.

FIG. 4 is a flow chart illustrating an example method of operating a TCM according to the present disclosure.

In step 400, the TCM logic, which may be part of or separate from any other FPA control logic, receives commands, possibly by way of a bus controller, from a host controller over an internal interface bus. This bus may be a low-speed bus such as I²C, commonly available, and suitable for commands as used herein.

In step 410, optionally in response to the received host commands, the TCM logic accesses provisioning and operational data stored in a TCM memory element and provides the data to the host over a second host internal interface bus. The second bus may be a higher speed data bus, such as the type commonly used for existing video camera video data, as well as other higher speed data applications.

In step 420, during run time image acquisition, the TCM FPA accesses run time operational data, including on a per pixel basis from the memory element directly to the FPA.

In step 430, once the TCM memory data has been received, the host processor sends commands over the first bus instruction the TCM processor to provide image frame data from the FPA to the host over the second higher speed bus. Thus, the TCM, in response to commands received on one bus, selectively chooses to deliver either TCM memory contents or video data on a second bus. During run time the high-speed bus delivers video data to the host, and the TCM control logic accesses run time data from the memory element directly, resulting in the host processor not required to run the FPA directly but rather just receive video data analogous to the way a visible camera module operates.

In step 440, the host processor uses the TCM memory data that is unique to the installed TCM to process and analyze the video data for a user. Desirably, the TCM app running on the host controller is standardized, and uses the data stored on the TCM for the camera unique aspects of operating the TCM.

One of the advantages of the TCM described herein is it provides the possibility of running the FPA in image acquisition mode entirely using the local memory and simple logic element, without per-pixel communication with the host. This is an important feature to achieve compatibility with existing host system standards. One example of runtime data is described below.

Many thermal FPA's are designed to share ROIC electronic circuit elements to simplify ROIC design. For instance, as each pixel's photodetector is selected by an ROIC switching network, various circuit elements such as integration capacitors and bias resistor networks are connected to each photodetector. As the bias is usually unique to each pixel and determined at factory calibration, a unique bias setting must be enabled for each pixel. In many current systems, this per-pixel bias information is provided by a camera dedicated controller. The architecture described herein allows for a much simpler, less expensive implementation.

The bias values may be stored in the memory element, and the starting address may be provided by the host processor pre-run or preloaded at calibration into the logic element. The logic element may simply clock through stored per pixel biases to ROIC registers starting as the FPA runs, allowing the FPA to run with no per pixel communication with a host processor using very simple logic. Accordingly, even for large provisioning data sets, the TCM may free run once it has the initial set-up and runtime data locations. This approach allows for a much less expensive and more universally interfaceable TCM's where the complex image processing is handed off to a powerful host processor, and the simplified pre-run and runtime operations are implemented in simple local logic with no TCM local processor required.

There may be multiple sets of biases stored, to accommodate at least partially for the drift due to ambient temperature as described in U.S. Pat. No. 9,584,750. Multiple bias sets can at least partially recreate dynamic bias adjustment vs ambient temperature feature by selecting differing bias sets depending on the ambient temperature of the FPA. This can be done either at the host or TCM logic element. For example, for two or more ambient temperature ranges, a differing starting address for bias values may be used. Alternatively or additionally, a large number of bias data sets corresponding to multiple ambient temperatures may be stored and accessed. An FPA temp sensor may be used by the ROIC control logic to trigger selection of the starting addresses. Other types of runtime data could be handled similarly.

Standard high-speed data interfaces may have more capacity than needed for just image data. MIPI CSI-2, for instance, supports up to four simultaneous virtual data channels, and each channel may be operated in a mode that allows for interleaved data streams. Thus, while one channel carries pixel imaging data, one or more of the other virtual channels can carry image processing data—offsets, gains, thermography and the like. Multiple sets of such data, analogous to the multiple sets of bias data, may be stored in the memory element. Then the appropriate data set for the conditions, such as at different ambient temperatures, may be delivered to the host along with the video data. For instance, gain and offset correction may be temperature dependent, as the biases described above. Rather than forcing the host to store multiple data sets and constantly check FPA temperature, the host could just use the real time image processing data per frame as it comes in, thereby further simplifying and standardizing the TCM interface to the host.

Some versions of MIPI support unidirectional low-speed data on the same wiring connections as the high-speed data, such as the arrangement of FIG. 2A. Thus arrangements with one physical interface, serving two functional communications requirements are possible.

Integrity checking of system components may be an important requirement for some host systems, such as in automotive host systems for example. Modules installed in vehicles may also have to conform to integrity standards for ensuring that the data provided by a module is assured to be valid. Tools to meet integrity requirements may be available from the standard busses. For example MIPI CSI-2 includes line count, frame count, and checksum in data packet headers, and QSPI includes check sums for data transfers. Use of these types of tools may allow for meeting system integrity standards without designing special features into the FPA's themselves.

Figure 5:
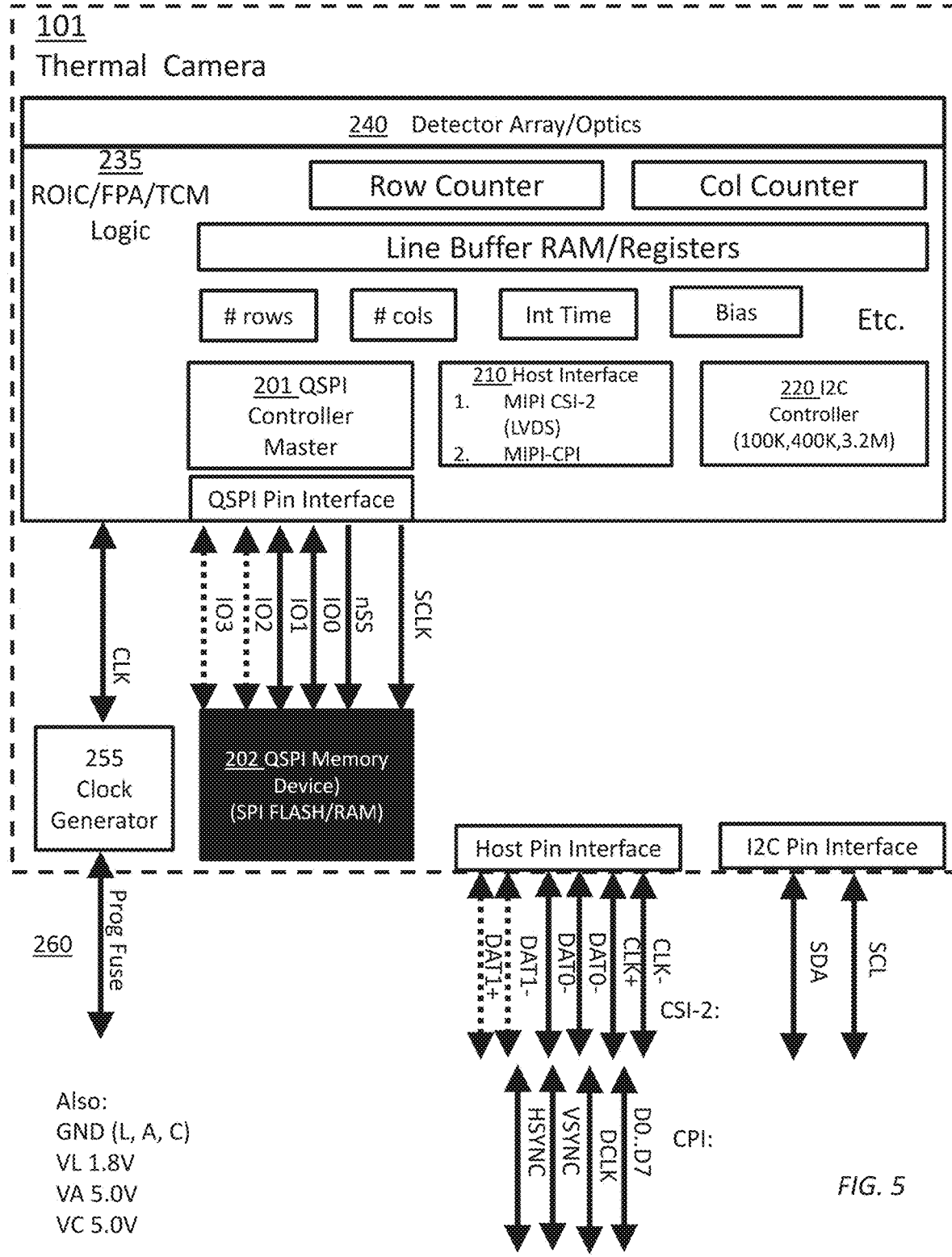
FIG. 5 is a block diagram illustrating an example embodiment of a TCM configured for integration into a PED including an on-FPA programmable ROIC clock.

Thermal imaging cameras may come under export controls for national security reasons, and some operating parameters may require specific controls. For example, frame rate may be limited for export to some jurisdictions, and the frame rate has to be securely set in a tamper-proof manner. In one particular example, FIG. 3 shows the FPA clock being supplied externally, which therefore may possibly not be tamper-proof. A tamper-proof implementation is shown in FIG. 5. As shown in FIG. 5, an onboard clock generator 255 is configured to have its frequency set by programmable fuses 260 at the time of manufacture. Thus, once the fuses are burned, the clock frequency is permanently fixed on the TCM itself. For example, if a resistor-capacitor/phase-locked loop (RC/PLL) oscillator design is used, the fuses could be used to select the frame rate permanently thereby meeting export requirements.

Depending on the embodiment, certain acts, events, or functions of any of the processes described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and process steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system.

The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processor configured with specific instructions, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. For example, the memory elements described herein may be implemented using a discrete memory chip, a portion of memory in a microprocessor, flash, EPROM, various types of RAM, or other types of memory.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. A software module can comprise computer-executable instructions which cause a hardware processor to execute the computer-executable instructions.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, and Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to illustrative embodiments, it will be understood that various omissions, substitutions, and changes in the form and details of the devices or processes illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A thermal camera module (TCM) configured for integration as a functional module into a host system, the host system including at least one controller and at least one internal data interface for accommodating functional modules of various types into the host system, the TCM comprising:
    at least one focal plane array (FPA) comprising a detector array and a read-out integrated circuit (ROIC), the ROIC comprising command and control input/outputs (I/O) and image frame data outputs;
    at least one memory element for storing data including at least one of provisioning and operational data for the FPA; and
    at least one control logic element, interfaced to ROIC command and control registers, an image frame data output of the ROIC, the at least one memory element, and the at least one internal data interface;
    wherein the control logic element is configured to, including in response to commands from a host controller on the at least one internal data interface, enable read/write access to the at least one memory element, read/write access to ROIC control registers, and read access to ROIC image frame data output;
    wherein the data stored in the memory element includes at least one of:
    integration time,
    biases,
    row and column configuration, and
    FPA configuration and identification; and
    wherein the control logic element is configured to write one of biases or other runtime data on a per-pixel basis to the ROIC as the FPA is imaging by accessing the memory element from a starting point address, wherein the starting point address is at least one of predetermined or set by the host controller, thereby allowing the FPA to operate without per-pixel communication with the host controller during imaging.

2. The TCM of claim 1, wherein the TCM is configured to be mechanically and electrically plug-in compatible with an internal module format of the host system.

3. The TCM of claim 1, wherein the data stored in the memory element includes at least one of:

thermography calibration data;
detector gain tables;
ambient temperature induced drift bias correction data;
display look up tables;
bad pixel maps;
lens correction data; and
other factory calibration data.

4. The TCM of claim 1, wherein the at least one internal data interface comprises at least:
a low-speed data bus; and
a high-speed data bus.

5. The TCM of claim 4, wherein the low-speed data bus supports bidirectional communication between the host controller and the control logic element, including one or more of the control logic element enabling the host controller to:
optionally read provisioning data from the memory element;
read and write to the ROIC registers, including setting provisioning data into the ROIC registers;
enable reading operational data from the memory element on the high-speed data bus;
enable running the ROIC; and
select acquisition of FPA video data on the high-speed data bus.

6. The TCM of claim 5, wherein communication between the host controller and the TCM on the high-speed data bus is unidirectional.

7. The TCM of claim 6, wherein the low-speed data bus is $I^2C$.

8. The TCM of claim 7, wherein the high-speed data bus is one of MIPI CSI-2 or MIPI CPI.

9. The TCM of claim 8, wherein bus supplied checksum and line/frame count data that is provided with the image frame data is available for integrity verification of the FPA.

10. The TCM of claim 1, wherein the memory element comprises non-volatile memory.

11. The TCM of claim 10, wherein the non-volatile memory comprises flash memory.

12. The TCM of claim 1, wherein the memory element comprises a QSPI memory element and the TEM control logic element comprises a QSPI controller master.

13. The TCM of claim 12, wherein the QSPI memory element comprises at least one of Flash or SPI RAM.

14. The TCM of claim 1, wherein the ROIC comprises an ROIC clock whose frequency is set by programmable fuses at the time of manufacture whereby the clock frequency cannot be changed after the fuses are burned.

15. The TCM of claim 1, wherein the starting point address is selected from a plurality of starting point addresses based at least in part on an ambient temperature at the FPA.

16. A method of operating a thermal camera module (TCM), comprising a focal plane array (FPA) comprising a detector array and a read-out integrated circuit (ROIC), a control logic element, and a memory element, the TCM configured for integration as a functional module into a host system, the host system including at least one controller and at least one internal data interface for accommodating functional modules of various types into the host system, the method comprising, by the control logic element, including in response to commands from a host controller on the at least one internal data interface:
enabling read/write access to the memory element;
enabling read/write access to ROIC control registers;
enabling ROIC run time access to the memory element during image acquisition; and
enabling read access to FPA image frame output,
wherein the logic element is configured to enable writing one of biases or other runtime data on a per-pixel basis to the ROIC as the FPA is imaging by accessing the memory element from a starting point address, wherein the starting point address is at least one of predetermined or set by the host controller, thereby allowing the FPA to operate without per-pixel communication with the host controller during imaging.

17. The method of claim 16, wherein the TCM is configured to be mechanically and electrically plug-in compatible with an internal module format of the host system.

18. The method of claim 16, wherein the memory element stores at least one of:
integration time;
bias voltages;
row and column configuration; and
FPA configuration and identification.

19. The method of claim 16, wherein the memory element stores at least one of:
thermography calibration data;
detector gain tables;
ambient temperature induced drift bias correction data;
display look up tables;
bad pixel maps;
lens correction data; and
other factory calibration data.

20. The method of claim 16, wherein the at least one internal data interface comprises at least a low-speed data bus and a high-speed data bus.

21. The method of claim 20 wherein the low-speed data bus supports bidirectional communication between the host controller and the and the control logic element, including one or more of the control logic element enabling the host controller to:
optionally read provisioning data from the memory element;
read and write to the ROIC registers, including setting provisioning data into the registers;
enable reading operational data from the memory element on the high-speed data bus;
enable running the ROIC; and
select acquisition of FPA video data on the high-speed data bus.

22. The method of claim 21, wherein communication between the host controller and the TCM on the high-speed data bus is unidirectional.

23. The method of claim 20, wherein the control logic element is configured to enable writing at least one of calibration or run time data to the high-speed bus simultaneously with video data.

24. The method of claim 16, further comprising using bus supplied checksum and line/frame count data provided with the image frame data for integrity verification of the FPA.

25. The method of claim 16, wherein the starting point address is selected from a plurality of starting point addresses based at least in part on an ambient temperature at the FPA.

26. A thermal camera module (TCM) configured for integration as a functional module into a host system, the host system including at least one controller and at least one internal data interface for accommodating functional modules of various types into the host system, the TCM comprising:
at least one focal plane array (FPA) comprising a detector array and a read-out integrated circuit (ROIC), the ROIC comprising command and control input/outputs (I/O) and image frame data outputs;

at least one memory element for storing data including at least one of provisioning and operational data for the FPA; and at least one control logic element, interfaced to ROIC command and control registers, an image frame data output of the ROIC, the at least one memory element, and the at least one internal data interface;

wherein the control logic element is configured to, including in response to commands from a host controller on the at least one internal data interface, enable read/write access to the at least one memory element, read/write access to ROIC control registers, and read access to ROIC image frame data output; and wherein the at least one internal data interface comprises at least two data interfaces, the at least two data interfaces comprising:
  a low-speed data interface for low data rate applications including command and configuration data; and
  a high-speed data interface suitable for high data rate applications including video data.

27. The TCM of claim 26, wherein the low-speed data bus supports bidirectional communication between the host controller and the control logic element, including one or more of the control logic element enabling the host controller to:
  optionally read provisioning data from the memory element;
  read and write to the ROIC registers, including setting provisioning data into the ROIC registers;
  enable reading operational data from the memory element on the high-speed data bus;
  enable running the ROIC; and
  select acquisition of FPA video data on the high-speed data bus.

28. The TCM of claim 27, wherein communication between the host controller and the TCM on the high-speed data bus is unidirectional.

29. The TCM of claim 28, wherein the low-speed data bus is I$^2$C.

30. The TCM of claim 29, wherein the high-speed data bus is one of MIPI CSI-2 or MIPI CPI).

31. The TCM of claim 30, wherein bus supplied checksum and line/frame count data that is provided with the image frame data is available for integrity verification of the FPA.

* * * * *